United States Patent Office 3,106,036
Patented Oct. 8, 1963

3,106,036
ANIMAL TRAPS
John U. Lehn, Lititz, Pa., assignor to Animal Trap Company of America, Lititz, Pa., a corporation of Pennsylvania
Filed Aug. 9, 1961, Ser. No. 131,052
1 Claim. (Cl. 43—93)

The present invention relates to traps and more particularly to animal traps.

The invention is an improvement over the trap described in U.S. Patent No. 2,947,107 and issued to the present applicant in August 1960.

An object of the invention is to provide a more economical trap, the operation of which is not adversely affected in its operation by rust and corrosion to which all animal traps are subject when in use.

A feature of the invention is a combination latch and trigger member for setting and springing the trap that is operable by pressure applied to the trigger from any direction having a component normal to the trigger thereby providing a more efficiently operable trap.

Figure 1:
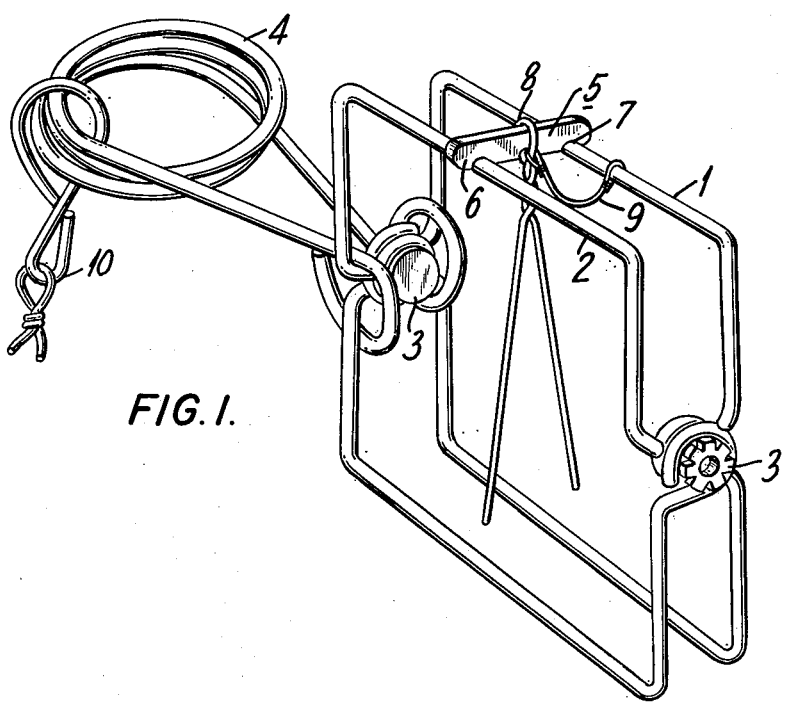
Figure 2:
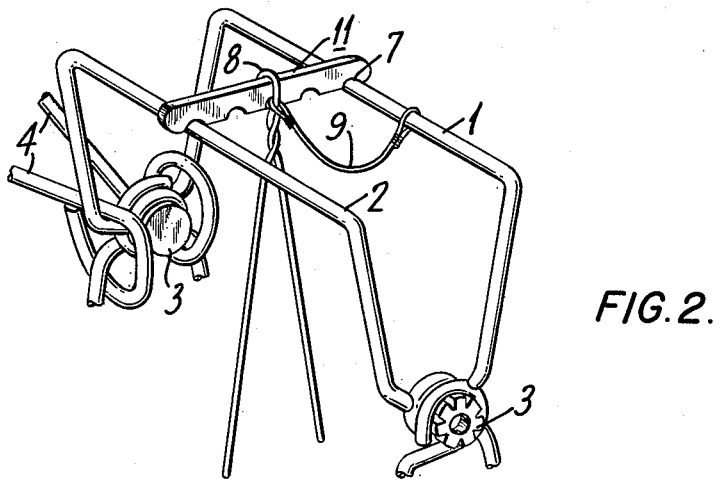

Other objects and features and a fuller understanding of the invention may be had by referring to the following description and claim, together with the accompanying drawing, in which:

FIGURE 1 is a perspective view of a trap in accordance with the invention and with the trap set, and FIGURE 2 is a partial similar perspective view of a trap in accordance with another embodiment of the invention.

Referring to FIG. 1, the invention comprises frame shaped jaws 1 and 2, each jaw having a pair of opposite frame sides connected by a pair of opposite frame ends. The frame sides of jaw 2 are shorter than those of jaw 1 so that the pair of frame ends of jaw 2 fit within the pair of frame ends of jaw 1. The adjacent frame ends of the respective jaws are pivotally connected by pivots 3 intermediate the frame sides of the respective jaws. The pivots 3 define a pivot axis parallel to the frame sides and normal to the frame ends and about which the frame shaped jaws are pivotable between a sprung position in which the opposite frame sides of jaw 1 are in adjacent relation with the respective frame sides of jaw 2, and a set position in which the respective frame sides of the jaws 1 and 2 are in opposite adjacent relation. The respective frame ends of jaw 1 are bent to oppositely and approximately equally offset the opposite frame sides from a plane passing through the pivot axis and corresponding to the plane of the jaw 1 before its frame ends were bent. The frame ends of jaw 2 are similarly but oppositely bent to adjacently oppose the respective frame sides of jaw 2 to those of jaw 1. The frame sides of jaws 1 and 2 are biased together by a coil spring 4 in the sprung position. The ends of spring 4 extend tangientally from opposite ends of the coil and are forced toward each other to tension the spring. With the spring partially tensioned, the spring ends with pivot 3 therebetween, slidably encircle a pair of the pivoted frame ends and are retained partially tensioned on the frame ends by the connected frame sides, thereby biasing the respective frame sides on the jaws 1 and 2 together in the sprung position. Pivoting the adjacent sides to the set position in opposite adjacent relation slides the ends of the spring along the frame ends toward the pivot 3 further tensioning the spring to snap said frame sides from the set position back to the sprung position.

A combination jaw latch and trigger member 5 is provided to hold and release the frame sides in and from the set position. The combination member 5 comprises an elongated latch bar 6 defining three longitudinally spaced transverse notches 7 in a longitudinal edge of the bar, and a trigger formed by a stiff wire twisted in a loop around the latch bar 6 at the middle notch and having the wire ends extending beyond said notch normal to the latch bar. The loop rigidly attaches the trigger 8 to the latch bar 6 for movement therewith and rotation of the latch bar around its longitudinal and transverse axes. A lanyard 9 can be secured to the loop of trigger 8 and to a frame side of a jaw to prevent the combination member from being lost. A chain 10 is secured to the spring 4 and to any convenient stationary object to prevent the trap from being carried away.

The trap is set by pivoting the jaws 1 and 2 around the pivots 3 against the bias of spring 4 to bring the respective sides of jaw 1 formerly adjacent the respective sides of jaw 2 in the sprung position into the opposite adjacent relationship of the set position. The combination latch and trigger member 5 is then positioned for the end notches 7 of the latch bar 6 to engage a pair of the adjacent frame sides in opposite adjacent relationship and hold them approximately together, with the trigger 8 extending between the jaws 1 and 2. Any pressure applied to the trigger 8 tending to move or rotate the latch bar around its longitudinal and transverse axes releases the engaged pair of frame sides from the notches 7, and the spring 4 with its ends sliding along the encircled frame ends toward the frame sides, snaps the frame sides back to their original biased position to catch and crush therebetween the originator of the applied pressure to the trigger.

Corrosion and rust formerly tended to require progressively increasing pressure to be applied to the trigger to release the set trap, the corrosion tending to prevent the rotation of a separate latch and trigger mounted for cooperative rotation on opposite frame sides of the respective jaws 1 and 2. In a trap according to the invention corrosion and rust tends to progressively reduce the pressure needed to apply to the trigger for releasing the set trap because corrosion and rust tends to enlarge the notches and reduce the surface area of the engaged frame sides to make a loser and more releasable engagement.

The embodiment of the invention illustrated in FIG. 2 provides a longer latch bar 11 having a plurality of notches 7 in addition to the center trigger engaged notch. The plurality of notches 11 provides means for setting the trap with the frame ends of the respective jaws spaced apart various distances to thereby vary the tension of the biasing spring 4 in accordance with the estimated size of the animal sought to be trapped.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I claim and desire to secure by Letters Patent is:

A trap comprising two similarframe-shaped jaws, each said jaw having opposite frame sides connected by opposite frame ends, pivot means pivotally connecting said frame ends of one said jaw to the respective frame ends of the other said jaw intermediate said frame sides for pivoting said frame-shaped jaws about a common pivot axis between a sprung position in which the opposite frame sides of said one jaw are in adjacent relation with the respective frame sides of said other jaw, and a set position in which the respective frame sides of the two jaws are in opposite adjacent relation, spring means having ends slidably engaged around a respective pair of pivotally connected frame ends for biasing said frame-shaped jaws around said pivot means from said set position to said sprung condition, a combination latch and trigger member comprising a latch bar having longitudinal and transverse axes and a longitudinal edge defining a plurality of transverse notches, and a trigger formed by a wire twisted to form a loop around said latch bar intermediate its ends at one said transverse notch, and with the wire ends extending at an angle therefrom for being contacted from any direction below the latch bar, said latch bar being rigidly attached to said trigger by its loop for movement only therewith, said latch and trigger member for engaging in said other notches an adjacent pair of frame sides of said respective jaws pivoted to said set position with said trigger extending between said frame-shaped jaws, said latch bar being releasable from engagement with said frame sides by rotation around its longitudinal and transverse axes whereby a releasing pressure on said trigger from any direction has proportionally complementary components normal to said axes to release, without substantial release pressure increase, said engaged frame sides from said notches to snap said frames from the set position to the sprung position.

References Cited in the file of this patent

UNITED STATES PATENTS

| | | |
|---|---|---|
| 531,571 | Scherb | Dec. 25, 1894 |
| 2,701,428 | Mau | Feb. 8, 1955 |
| 2,947,107 | Lehn | Aug. 2, 1960 |